United States Patent
Stingu et al.

(10) Patent No.: US 11,621,592 B2
(45) Date of Patent: *Apr. 4, 2023

(54) TRANSLATION UNIT FOR WIRELESS POWER TRANSFER

(71) Applicant: Spark Connected LLC, Dallas, TX (US)

(72) Inventors: Petru Emanuel Stingu, Dallas, TX (US); Kenneth Moore, Dallas, TX (US); Yulong Hou, Farmers Branch, TX (US); Ruwanga Dassanayake, Dallas, TX (US)

(73) Assignee: SPARK CONNECTED LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/505,350

(22) Filed: Oct. 19, 2021

(65) Prior Publication Data

US 2022/0045558 A1 Feb. 10, 2022
US 2023/0029451 A9 Jan. 26, 2023

Related U.S. Application Data

(63) Continuation of application No. 16/837,332, filed on Apr. 1, 2020, now Pat. No. 11,152,823.

(60) Provisional application No. 62/827,658, filed on Apr. 1, 2019.

(51) Int. Cl.
*H02J 50/90* (2016.01)
*H02J 50/10* (2016.01)

(52) U.S. Cl.
CPC ............ *H02J 50/90* (2016.02); *H02J 50/10* (2016.02)

(58) Field of Classification Search
CPC .. H02J 50/40; H02J 50/10; H02J 50/80; H02J 50/90; H02J 50/12; H02J 50/60; H02J 50/70; H02J 50/50; H02J 50/20
See application file for complete search history.

(56) References Cited

U.S. PATENT DOCUMENTS

| | | |
|---|---|---|
| 3,376,578 A | 4/1968 | Sawyer |
| 3,735,231 A | 5/1973 | Sawyer |
| 4,860,183 A | 8/1989 | Maeda et al. |
| 5,434,504 A | 7/1995 | Hollis et al. |
| 5,498,948 A | 3/1996 | Bruni et al. |
| 6,175,169 B1 | 1/2001 | Hollis, Jr. et al. |
| 6,184,651 B1 | 2/2001 | Fernandez et al. |
| 6,445,093 B1 | 9/2002 | Binnard |
| 6,803,744 B1 | 10/2004 | Sabo |

(Continued)

OTHER PUBLICATIONS

Consumer Reports, "Wireless charging pad review", Dec. 11, 2013, 5 pages, https://www.consumerreports.org/cro/news/2013/10/wireless-charging-pad-reviews/index.htm.

(Continued)

*Primary Examiner* — John W Poos
(74) *Attorney, Agent, or Firm* — Slater Matsil, LLP

(57) ABSTRACT

In an embodiment, a wireless power transmitter module includes a sensing grid configured to detect a receiver, a movable wireless power transmitter unit including a wireless power transmitter coil, and a two-dimensional linear motor including a plurality of linear motor coils configured to move the movable wireless power transmitter unit in a two-dimensional plane towards a location of the receiver.

20 Claims, 9 Drawing Sheets cross-section view

(56) References Cited

U.S. PATENT DOCUMENTS

| | | | |
|---|---|---|---|
| 6,949,845 B2 | 9/2005 | Oisugi et al. | |
| 8,049,370 B2 | 11/2011 | Azancot et al. | |
| 8,193,769 B2 | 6/2012 | Azancot et al. | |
| 8,907,619 B2* | 12/2014 | Shukuya | G12B 5/00 |
| | | | 74/490.09 |
| 8,957,549 B2 | 2/2015 | Kesler et al. | |
| 9,590,444 B2 | 3/2017 | Walley et al. | |
| 9,800,191 B2 | 10/2017 | Barsilai et al. | |
| 9,853,441 B2 | 12/2017 | Teggatz et al. | |
| 10,054,622 B2 | 8/2018 | Hernandez et al. | |
| 10,079,090 B2 | 9/2018 | Teggatz et al. | |
| 10,168,443 B2 | 1/2019 | Mangano et al. | |
| 2006/0061323 A1 | 3/2006 | Cheng et al. | |
| 2009/0079387 A1* | 3/2009 | Jin | H02J 50/70 |
| | | | 320/108 |
| 2009/0153098 A1* | 6/2009 | Toya | H02J 50/10 |
| | | | 320/108 |
| 2010/0181841 A1 | 7/2010 | Azancot et al. | |
| 2010/0219183 A1 | 9/2010 | Azancot et al. | |
| 2010/0244579 A1 | 9/2010 | Sogabe et al. | |
| 2011/0050164 A1 | 3/2011 | Partovi et al. | |
| 2011/0062793 A1 | 3/2011 | Azancot et al. | |
| 2011/0074344 A1 | 3/2011 | Park et al. | |
| 2011/0121660 A1 | 5/2011 | Azancot et al. | |
| 2011/0227527 A1 | 9/2011 | Zhu et al. | |
| 2012/0032632 A1 | 2/2012 | Soar | |
| 2013/0049484 A1 | 2/2013 | Weissentern et al. | |
| 2013/0082651 A1 | 4/2013 | Park et al. | |
| 2013/0257172 A1 | 10/2013 | Teggatz et al. | |
| 2013/0264973 A1 | 10/2013 | Garg et al. | |
| 2013/0285601 A1 | 10/2013 | Sookprasong et al. | |
| 2013/0300204 A1 | 11/2013 | Partovi | |
| 2014/0080409 A1 | 3/2014 | Frankland et al. | |
| 2014/0184150 A1 | 7/2014 | Walley | |
| 2015/0115877 A1 | 4/2015 | Arai et al. | |
| 2015/0142348 A1 | 5/2015 | Huang et al. | |
| 2015/0249484 A1 | 9/2015 | Mach et al. | |
| 2015/0341087 A1 | 11/2015 | Moore et al. | |
| 2016/0149440 A1 | 5/2016 | Staring et al. | |
| 2016/0161288 A1 | 6/2016 | Lu | |
| 2017/0163100 A1 | 6/2017 | Vocke et al. | |
| 2017/0274788 A1* | 9/2017 | Zhang | B60L 53/66 |
| 2019/0109498 A1 | 4/2019 | Stingu et al. | |
| 2019/0190320 A1 | 6/2019 | Park | |
| 2019/0238007 A1* | 8/2019 | Bober | H02K 7/14 |
| 2019/0319494 A1 | 10/2019 | Park et al. | |
| 2019/0334388 A1 | 10/2019 | Van Wageningen et al. | |
| 2020/0313471 A1* | 10/2020 | Stingu | H02J 50/90 |

OTHER PUBLICATIONS

Digi-Key Electronics, "Inductive Versus Resonant Wireless Charging: A Truce May be a Designer's Best Choice", Aug. 2, 2016, 8 pages.

Gao, Xiang, "Demodulating Communication Signals of Qi-Compliant Low-Power Wireless Charger Using MC56F8006 DSC", NXP Freescale Semiconductor Application Note, Document No. AN4701, Rev. 0, Mar. 2013, 21 pages.

Jansen, J. W., et al., "Overview of Analytical Models for the Design of Linear and Planar Motors", IEEE Transactions on Magnetics, vol. 50, No. 11, Nov. 2014, 8 pages.

Johns, Bill et al., "Adapting Qi-compliant wireless-power solutions to low-power wearable products", Texas Instruments, High-Performance Analog Products, 2Q, 2014, Analog Applications Journal, 7 pages.

Kot, Thomas, "LC Sensor Rotation Detection with MSP430 Extended Scan Interface (ESI)", Texas Instruments, Application Report, SLAA639, Jul. 2014, 33 pages.

Lynch, Brian T., "Under the Hood of a DC/DC Boost Converter", Texas Instruments, Texas Instruments, Power Supply Design Seminar, Paper SEM1800, Dallas, TX, USA, 2008-2009, 26 pages.

Rice, John, "Examining Wireless Power Transfer", Texas Instruments, 2014/2015 Power Supply Design Seminar, 38 pages.

Texas Instruments "Industry-Leading Wireless Power Solutions—The Most Widely Adopted in the Market", ti.com/wirelesspower, SLYT485C, 3 pages.

Texas Instruments, "Introduction to Wireless Power", QI WPC 1.1 compliant, www.ti.com/wirelesspower, 49 pages.

Waters, Benjamin et al., "Optimal Coil Size Ratios for Wireless Power Transfer Applications", IEEE International Symposium on Circuits and Systems (ISCAS), Jun. 1-5, 2014, 4 pages.

Wikipedia, "Electromagnetic coil", https://en.wikipedia.org/w/index.php?title=Electromagnetic_coil&oldid=776415501, Apr. 2017, 6 pages.

Wikipedia, "Inductive charging", https://en.wikipedia.org/w/index.php?title=Inductive_charging&oldid=802615270, Sep. 2017, 7 pages.

Wikipedia, "Qi (standard)", https://en.wikipedia.org/w/index.php?title=Qi_(standard)&oldid=803427516, Oct. 2017, 5 pages.

ZENS, "ZENS First Worldwide to Introduce Built-in Wireless (Sub-)Surface Charger with Apple and Samsung Fast Charge", Jan. 24, 2019, 5 pages.

* cited by examiner

PRIOR ART cross-section view perspective view top view cross-section view top view cross-section view cross-section view top view top view cross-section view

# TRANSLATION UNIT FOR WIRELESS POWER TRANSFER

CROSS-REFERENCE TO RELATED APPLICATIONS

This application is a continuation of U.S. application Ser. No. 16/837,332, filed on Apr. 1, 2020, which claims the benefit of U.S. Provisional Application No. 62/827,658, filed on Apr. 1, 2019, which application is hereby incorporated herein by reference.

TECHNICAL FIELD

The present disclosure relates generally to an electronic system and method, and, in particular embodiments, to wireless power transfer.

BACKGROUND

Wireless charging systems are becoming ubiquitous in today's society. For example, many smartphones and wearables implement wireless charging technology. Ease of use, greater reliability, spatial freedom, reduced connectors and openings, and the possibility of hermetically sealing are among the benefits offered by wireless charging. Wireless charging standards allow for interoperability between different devices and manufacturers. Some wireless charging standards, such as the Qi standard from the Wireless Power Consortium, are becoming widely adopted.

FIG. 1 shows exemplary wireless charging system 100. Wireless charging system 100 includes a transmitter (TX) device 102 that includes a transmitter coil $L_{TX}$, and a receiver (RX) device 104 that includes a receiver coil $L_{RX}$. The efficiency of the wireless power transmission generally depends on the coupling between the coil $L_{TX}$ and coil $L_{RX}$. The coupling between the coil $L_{TX}$ and coil is generally based on the relative position between the coil $L_{TX}$ and coil $L_{RX}$.

Wireless power applications generally require freedom of positioning of the RX device to allow ease of use and increase market adoption. A single, non-movable transmitter coil $L_{TX}$ generally requires precise placement of the RX device. Multiple, overlapped transmitter coils $L_{TX}$ allow more freedom of positioning but increase cost, reduce system efficiency and create more heat. Moving transmitter coils $L_{TX}$ using servomechanisms driven with rotating servomotors have complex mechanisms that are expensive and prone to failure.

SUMMARY

In accordance with an embodiment, a wireless power transmitter module includes a sensing grid configured to detect a receiver, a movable wireless power transmitter unit including a wireless power transmitter coil, and a two-dimensional linear motor including a plurality of linear motor coils configured to move the movable wireless power transmitter unit in a two-dimensional plane towards a location of the receiver.

In accordance with an embodiment, a method for wireless power transfer includes detecting a receiver using a sensing grid, and moving a movable wireless power transmitter unit that includes a wireless power transmitter coil in a two-dimensional plane towards a location of the receiver using a two-dimensional linear motor.

In accordance with an embodiment, a wireless power transmitter module includes a sensing grid having a sensing layer and configured to detect a receiver, a fixed layer that is parallel to the sensing layer and includes a metal, a movable wireless power transmitter unit including a wireless power transmitter coil, and a two-dimensional linear motor. The movable wireless power transmitter unit is located between the sensing layer and the fixed layer. The two-dimensional linear motor is configured to move the movable wireless power transmitter unit in a two-dimensional plane towards a location of the receiver, where the two-dimensional plane is parallel to the sensing layer.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a wireless power system that includes a translation transmitter unit for wireless power transfer that operates, e.g., according to the Qi standard. Embodiments of the present invention may operate without complying with the Qi standard. Applications of some embodiments, include consumer electronics (e.g., smartphones, tablets), wearables (e.g., smart watches) and automotive (e.g., infotainment systems), as well as commercial and residential uses (e.g., sub-surface charging). Other applications are also possible.

In an embodiment of the present invention, a movable wireless power transmitter unit moves in a two-dimensional (2D) plane towards a wireless power receiver using a 2D linear motor. In some embodiments, a sensing grid is used to detect the presence and location of the receiver. In some embodiments, the sensing grid is also used to detect the location of the movable wireless power transmitter unit.

Figure 1:
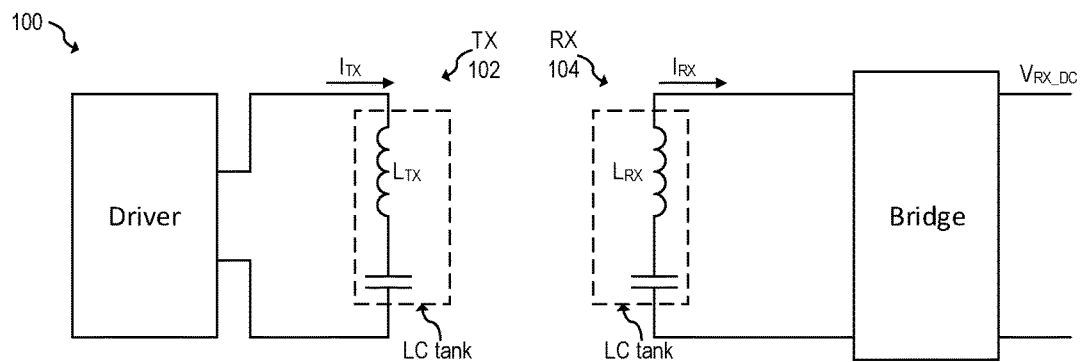
FIG. 1 shows an exemplary wireless charging system.
Figure 2A:
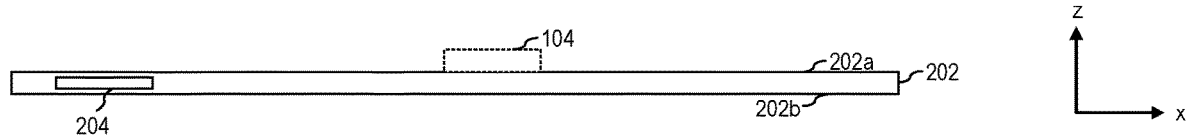
FIGS. 2A-2C show cross-section, perspective, and top view, respectively, of a transmitter module, according to an embodiment of the present invention.
Figure 2B:
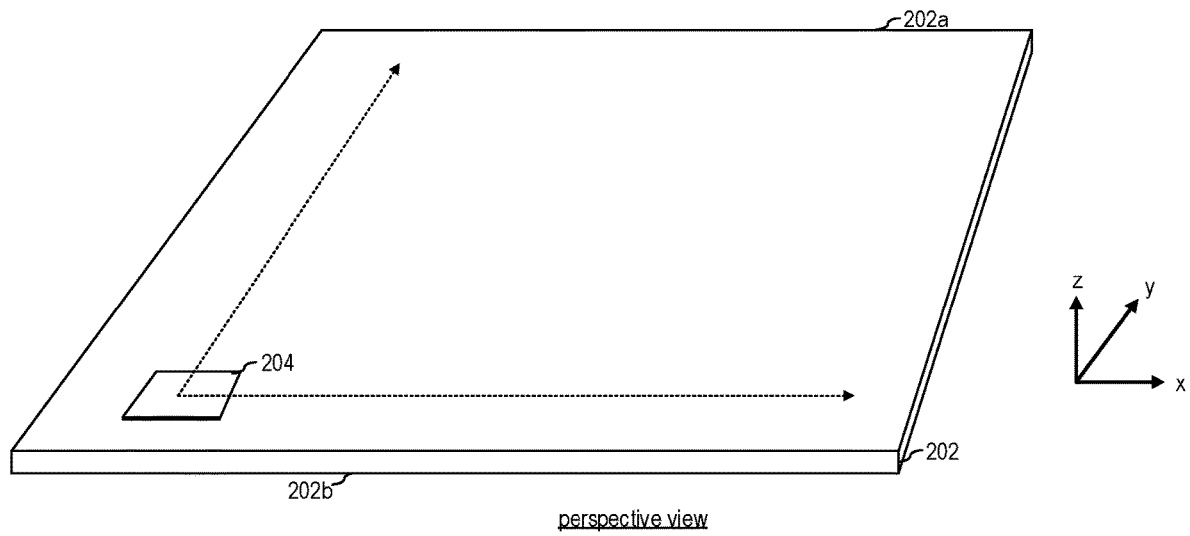
Figure 2C:
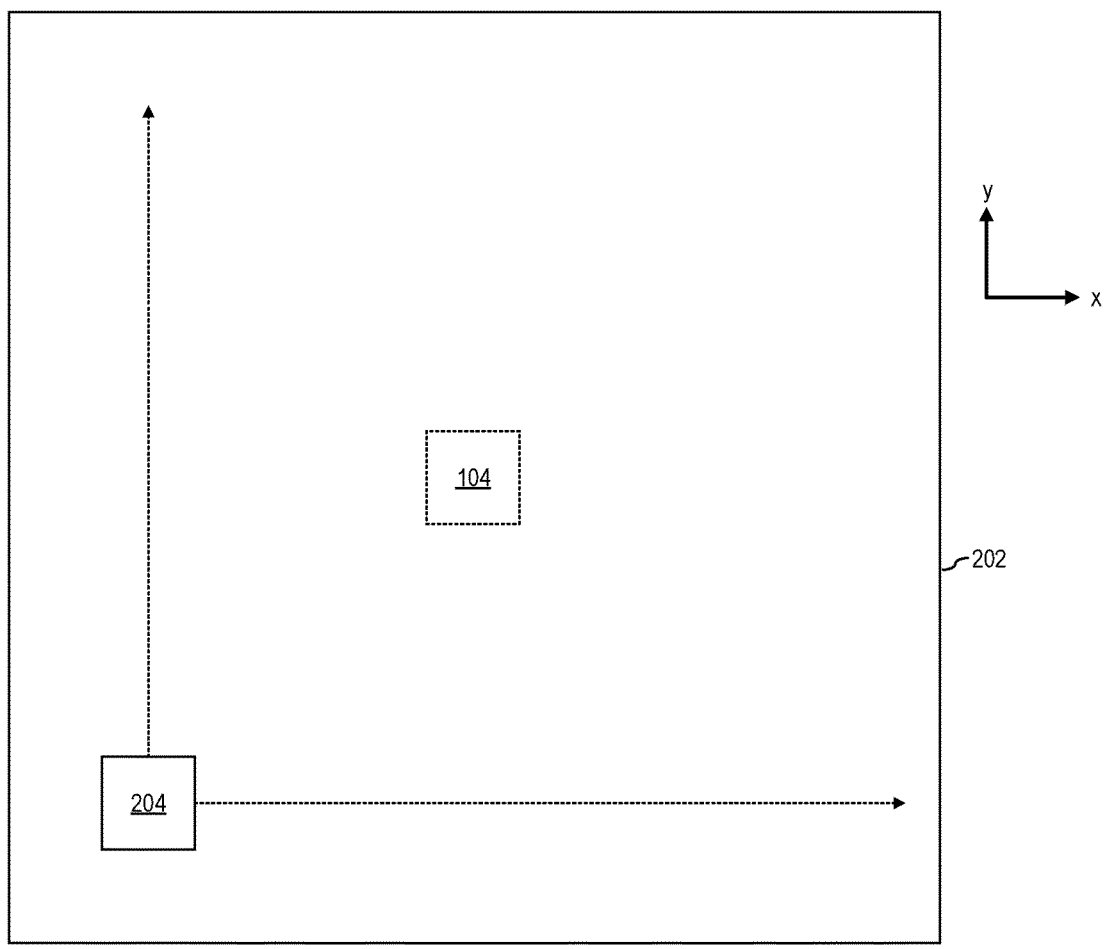

FIGS. 2A-2C show cross-section, perspective, and top view, respectively, of a transmitter module 202, according to an embodiment of the present invention. Transmitter module 202 includes (e.g., encloses) movable wireless power transmitter unit 204. Movable wireless power transmitter unit 204 includes a transmitter coil $L_{TX}$ of a TX device, such as TX device 102. In some embodiments, the entire TX device is implemented in movable wireless power transmitter unit 204. In other embodiments, only a portion of the TX device is implemented in movable wireless power transmitter unit 204.

During normal operation, a receiver device, such as receiver device 104, may be placed over transmitter module 202 for wireless power transmission. In some embodiments, receiver device 104 may be placed in direct contract with surface 202a of transmitter module 202. In other embodiments, such as in sub-surface wireless charging, receiver device 104 may be placed over surface 202a at a distance from surface 202a (in the z-axis) greater than 0 cm, such as at 2 cm, 10 cm, or more. In some embodiments, receiver device 104 may be placed at any (x,y) location in the surface 202a plane.

Transmitter module 202 detects the presence and (x,y) location of receiver device 104, using, e.g., foreign object detection (FOD) techniques, and moves or places movable wireless power transmitter unit 204 below receiver coil $L_{RX}$ of receiver device 104. Once the transmitter coil $L_{TX}$ of wireless power transmitter unit 204 is below receiver coil $L_{RX}$, wireless power transmission begins, e.g., according to the Qi standard.

In some embodiments, a controller (not shown in FIGS. 2A-2C) implemented, e.g., in movable wireless power transmitter unit 204 is used to detect the presence and location of receiver device 104 and to control movement of movable wireless power transmitter unit 204 (e.g., by injecting or causing current to be injected in one or more linear motor coils). Such controller may be implemented as a general purpose controller, or as a custom controller that uses, e.g., combinatorial logic coupled to a memory. Other implementation of the controller may also be used.

In some embodiments, movable wireless power transmitter unit 204 is powered using a flexible power cable (not shown in FIGS. 2A-2C). Some embodiments may power movable wireless power transmitter unit 204 using a flexible printed circuit board (PCB), or another type of laminated structure.

Transmitter device 102 and receiver device 104 may be implemented in any way known in the art, such as using inductive or resonant charging, for example.

In some embodiments, a 2D linear motor (not shown in FIGS. 2A-2C) is used to move wireless power transmitter unit 204 across the 2D (x,y) plane (inside transmitter module 202). In some embodiments, the 2D linear motor may be implemented as a 2D synchronous linear motor. In other embodiments, the 2D linear motor may be implemented as a 2D asynchronous linear motor.

A linear motor may be understood as a rotary electric motor in which the rotor and stator circular magnetic field components are laid out in a straight line. A 2D linear motor (also referred to as a planar motor) may be implemented, e.g., with two linear motors that are orthogonal (e.g., perpendicular) to each other so as to allow movement in a plane. The general operation of planar motors is well understood in the art, thereby rendering additional explanations superfluous.

Figure 3:
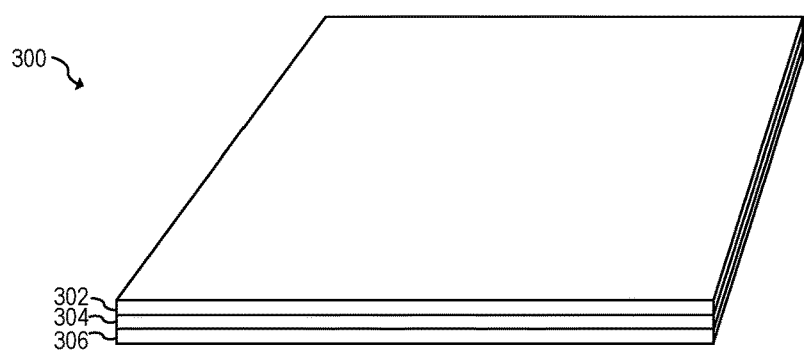
FIG. 3 shows a movable wireless power transmitter unit of the transmitter module of FIGS. 2A-2C, according to an embodiment of the present invention.

FIG. 3 shows movable wireless power transmitter unit 300, according to an embodiment of the present invention. Movable wireless power transmitter unit 204 may be implemented as movable wireless power transmitter unit 300. Movable wireless power transmitter unit 300 includes TX coil layer 302, ferrite layer 304, and linear motor coil layer 306.

Figure 4:
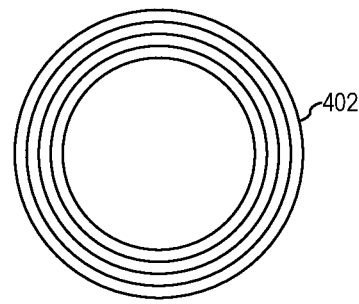
FIGS. 4 and 5 show TX coil of the movable wireless power transmitter unit of FIG. 3, according to an embodiment of the present invention.
Figure 4:
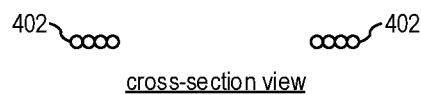

TX coil layer 302 includes one or more TX coils $L_{TX}$ used for wireless power transmission. The TX coils $L_{TX}$ may be implemented using wire windings, PCB traces or stamped wire, for example. FIG. 4 shows single TX coil 402, according to an embodiment of the present invention. TX coil layer 302 may include TX coil 402. Coils with other shapes and number of windings may also be used.

Figure 5:
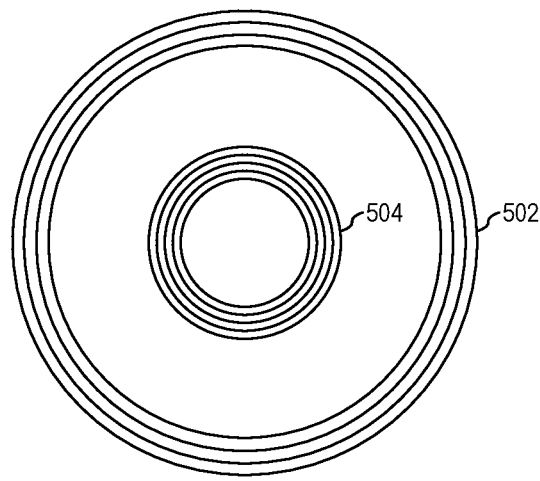
Figure 5:
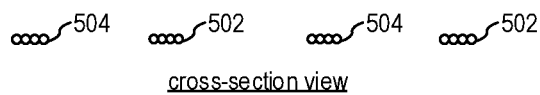

As another example, FIG. 5 shows TX coils 502 and 504, according to an embodiment of the present invention. TX coil layer 302 may include a plurality of TX coils, such as TX coils 502 and 504. Coils with other shapes and number of windings may also be used.

In some embodiments, TX coil 504 (small winding) can be used to charge smaller RX devices, such as headphones or smartwatches; and TX coil 502 (large winding) may be used to charge larger devices, such as smartphones or tablets. In another possible implementation, TX coil 504 (small winding) may be used to charge, e.g., smartphones while TX coil 502 (large winding) may be used to charge, e.g., laptops. In some embodiments, TX coil layer 302 may include three TX coils, which may be used to charge devices as small as smartwatches and as large as laptops.

In some embodiments, the plurality of TX coils of TX coil layer 302 may be used one at a time. In other embodiments, two (or more) TX coils of TX coil layer 302 may be used simultaneously. In some embodiments, the TX coils may be used one at a time or simultaneously based on the type of receiver device 104 that is being powered.

In some embodiments, linear motor coil layer 306 includes a plurality of linear motor coils. The linear motor coils may be implemented using wire windings, PCB traces or stamped wire, for example. In some embodiments, the number of linear motor coils in linear motor coil layer 306 may be 3 or more.

In some embodiments, a fixed (e.g., aluminum) plate is attached to, e.g., surface 202b of transmitter module 202. The direction of movement of movable wireless power transmitter unit 300 may be determined by which coils in linear motor coil layer 306 are activated and by the sequence of current flow through the activated coils.

In some embodiments, the plurality of linear motor coils may be activated (e.g., pulsed with an electrical current), e.g., sequentially and, e.g., in an asynchronous manner, to achieve 2D movement. Some embodiments may use square wave signals for activating the linear motor coils (e.g., in a phase-shifter manner), where the speed of movement of movable wireless power transmitter unit 300 is based on the frequency of the square wave signals. In some embodiments, the square wave signals may be modulated using pulse-width modulation (PWM).

Figure 6:
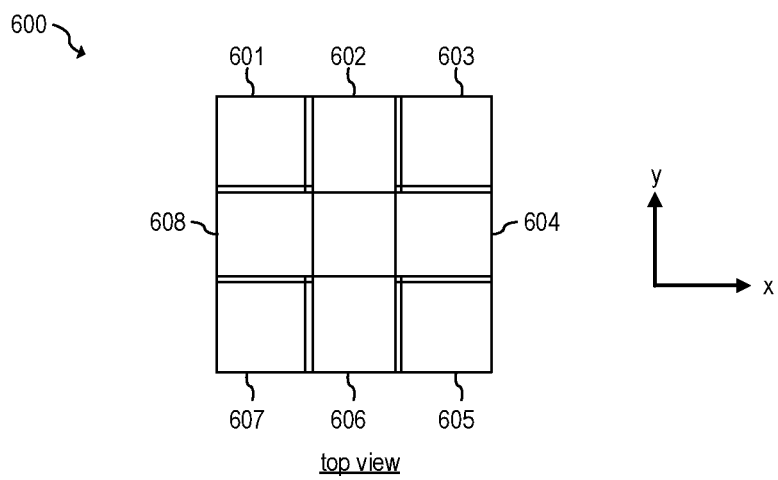
FIGS. 6-8 show possible arrangements of linear motor coils inside the linear motor coil layer of the movable wireless power transmitter of FIG. 3, according to an embodiment of the present invention.

For example, FIG. 6 shows arrangement 600 of linear motor coils, according to an embodiment of the present invention. Linear motor coil layer 306 may include arrangement 600 of linear motor coils.

As shown in FIG. 6, arrangement 600 includes 8 coils 601-608 that are partially overlapping in a square pattern. Each of the 8 coils 601-608 has one or more turns and has a square shape. In some embodiments, the shape of the coils of arrangement 600 may be different (e.g., such as circular shape).

The direction of movement in arrangement 600 may be determined based on the sequence of activation of the 8 coils. For example, activating (e.g., pulsing) a coil of the arrangement 600 may cause eddy currents in the aluminum plate (not shown) that is beneath arrangement 600 (in the z-axis) so that the magnetic field created by the eddy currents interact with the variable magnetic field generated by the activated coil to push it in a particular direction. For example:

a) a left to right motion (positive direction in the x-axis) may be achieved by: simultaneously activating coils 601, 608, and 607, then simultaneously activating coils 602 and 606, and then simultaneously activating coils 603, 604 and 606;

b) a right to left motion (negative direction in the x-axis) may be achieved by: simultaneously activating coils 603, 604 and 606, then simultaneously activating coils 602 and 606, and then simultaneously activating coils 601, 608, and 607;

c) an up motion (positive direction in the y-axis) may be achieved by: simultaneously activating coils 605, 606 and 607, then simultaneously activating coils 604 and 608, and then simultaneously activating coils 601, 602 and 603;

d) a down motion (negative direction in the y-axis) may be achieved by: simultaneously activating coils 601, 602 and 603 then simultaneously activating coils 604 and 608, and then simultaneously activating coils 605, 606 and 607;

e) a clockwise rotating motion may be achieved by sequentially activating coils 601, 602, 603, 604, 605, 606, 607, and 608; and f) a counter-clockwise rotating motion may be achieved by sequentially activating coils 601, 608, 607, 606, 605, 604, 603 and 602.

The motions a) to f) with respect to arrangement 600 are only exemplary and may be combined to achieve motions in other directions, such as a diagonal movement.

As exemplified by motions a) to f), movable wireless power transmitter unit 300 may move in 2D (x,y axis), as well as rotate.

Figure 7:
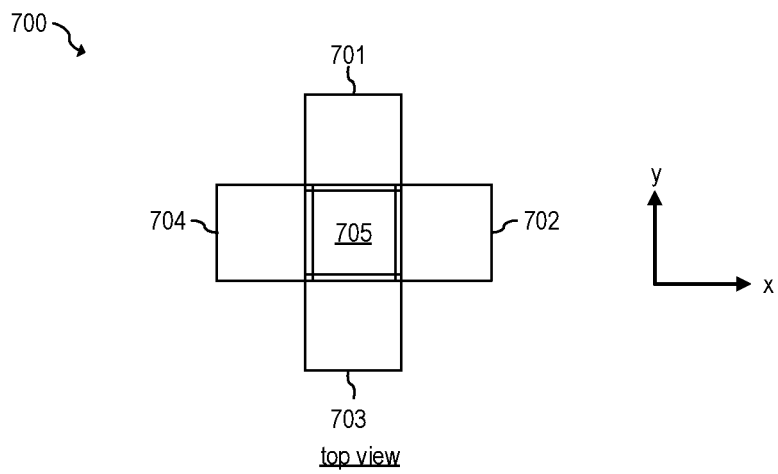

It is understood that arrangement 600 is only exemplary, and that other arrangements are also possible. For example, FIG. 7 shows arrangement 700 of linear motor coils 701-705, according to an embodiment of the present invention. Linear motor coil layer 306 may include arrangement 700 of linear motor coils 701-705.

As shown in FIG. 7, arrangement 700 includes 5 coils that are partially overlapping in a star pattern. Each of the 5 coils has one or more turns and has a square shape. In some embodiments, the shape of the coils of arrangement 700 may be different (e.g., such as circular shape).

Example of activation patterns for arrangement 700 include:

a) a left to right motion (positive direction in the x-axis) may be achieved by sequentially activating coils 704, 705 and 702.

b) a right to left motion (negative direction in the x-axis) may be achieved by sequentially activating coils 702, 705 and 704;

c) an up motion (positive direction in the y-axis) may be achieved by sequentially activating coils 703, 705 and 701;

d) a down motion (negative direction in the y-axis) may be achieved by sequentially activating coils 701, 705 and 703;

e) a clockwise rotating motion may be achieved by sequentially activating coils 701, 702, 703 and 704; and f) a counter-clockwise rotating motion may be achieved by sequentially activating coils 701, 704, 703 and 702.

The motions a) to f) with respect to arrangement 700 are only exemplary and may be combined to achieve motions in other directions, such as a diagonal movement.

Figure 8:
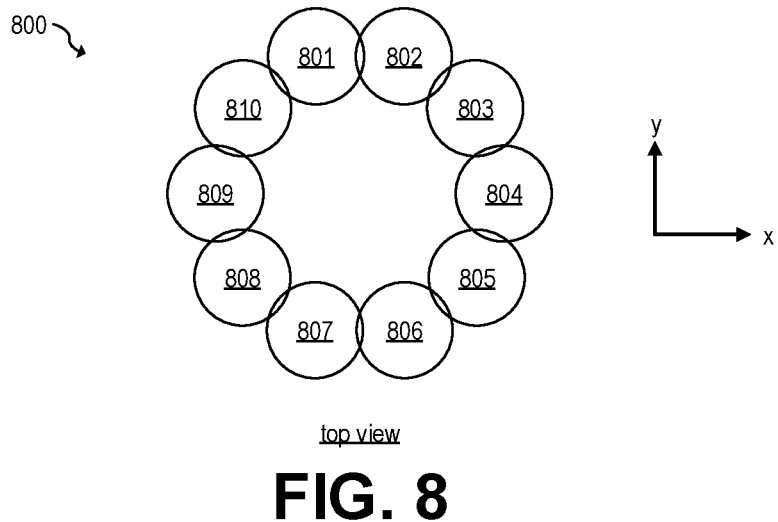

As yet another example, FIG. 8 shows arrangement 800 of linear motor coils, according to an embodiment of the present invention. Linear motor coil layer 306 may include arrangement 800 of linear motor coils. Linear motor coil layer 306 may include arrangement 800 of linear motor coils.

As shown in FIG. 8, arrangement 800 includes 10 coils 801-810 that are partially overlapping in a circular pattern. Each of the 10 coils 801-810 has one or more turns and has a circular shape. In some embodiments, the shape of the coils 801-810 of arrangement 800 may be different (e.g., such as square shape).

Activation patterns for arrangement 800 include simultaneously activating a first group of 3 coils, and then simultaneously activating a second group of 3 coils opposite to the first group. For example, for a left to right motion (positive direction in the x-axis), coils 808, 809 and 810 are simultaneously activating, and then coils 803, 804, and 805 are simultaneously activating. In a similar manner, other movements in the x, y plane may be achieved. Rotation (clockwise or counter-clockwise) may be achieved by sequentially activating the coils (clockwise or counter-clockwise).

In some embodiments (e.g., as shown in FIG. 3), ferrite layer 304 is disposed between TX coil layer 302 and linear motor coil layer 306. For example, in some embodiments, ferrite layer 304 is attached to the bottom of TX coil layer 302, and may prevent magnetic flux from linear motor coil layer 306 to couple to the TX coil(s) $L_{TX}$ of TX coil layer 302. In some embodiments, ferrite layer 304 guides the AC magnetic field for wireless power transfer as well as the low frequency and DC fields for the planar motor coils, which may coexist without interference.

Figure 9:
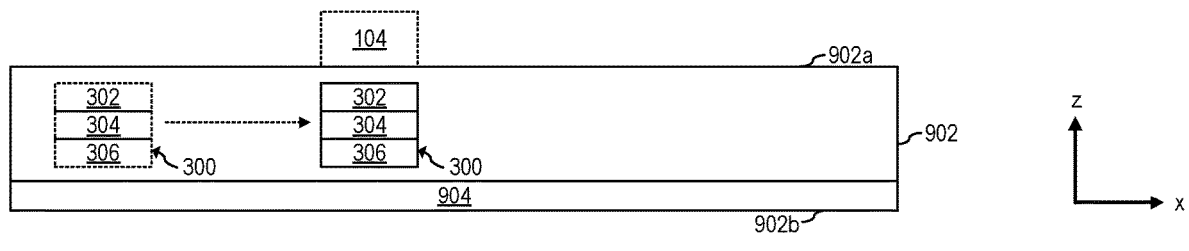
FIG. 9 shows a cross-section view of a transmitter module, according to an embodiment of the present invention.

FIG. 9 shows a cross-section view of a transmitter module 902, according to an embodiment of the present invention.

As shown in FIG. 9, transmitter module 902 includes metal layer 904 (e.g., attached to bottom surface 902b of transmitter module 902). In some embodiments, metal layer 904 may be implemented as an aluminum plate. Other metals, such as copper, may also be used.

In some embodiments, the presence of aluminum metal layer 904 may cause movable wireless power transmitter unit 300 to levitate above layer 904 when moving (e.g., towards receiver device 104), thereby reducing friction while moving, thereby advantageously increasing efficiency and/or reducing noise while moving, e.g., towards receiver device 104.

In some embodiments, the transmitter module (e.g., 202 or 902) detects the presence and location of receiver device 104 using a sensing grid, e.g., that is attached to the top surface (e.g., 202a, 902a) of the transmitter module (e.g., 202, 902). For example, FIG. 10 shows sensing grid 1002, according to an embodiment of the present invention.

Figure 10:
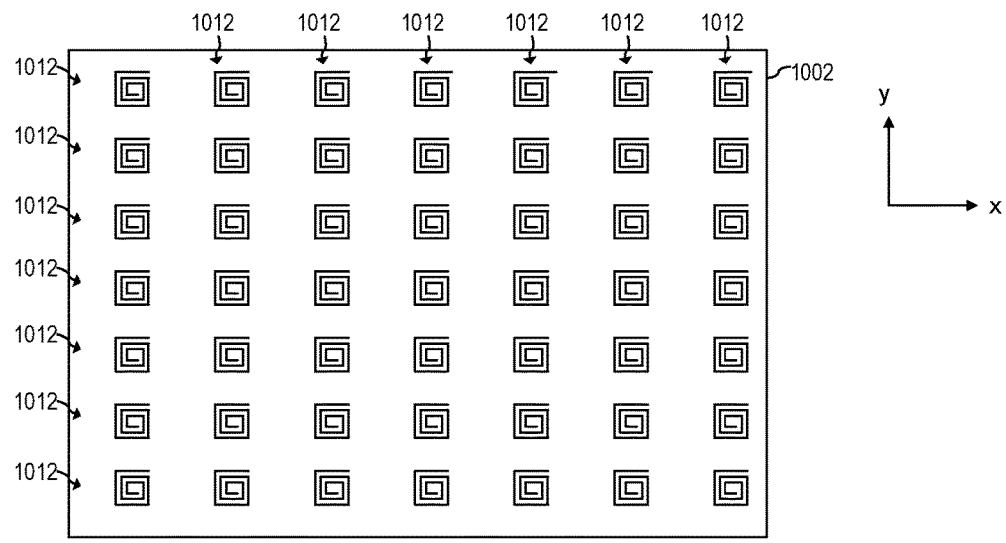
FIG. 10 shows a sensing grid, according to an embodiment of the present invention.

As shown in FIG. 10, sensing grid 1002 includes a plurality of sensing coils 1012 arranged in rows and columns. In this embodiment, seven rows and seven columns equally spaced are shown. In some embodiments, a different numbers of rows and columns (e.g., six rows and five columns) may be used. In some embodiments, the spacing between each of the plurality of sensing coils 1012 may be different. In some embodiments, other arrangements may also be used.

During normal operation, each sensing coil 1012 is energized, e.g., by conducting current through them. After energizing sensing coils 1012, a voltage that is related (e.g., proportional) to the strength of the magnetic field flowing through the core area (magnetic axis) of the sensing coil 1012 is generated. By measuring, e.g., after energizing, the voltage across terminals of each of the sensing coils 1012 (e.g., in a known manner), it is possible to detect disturbances in the magnetic field caused by a foreign object, thereby enabling the detection of the presence of a foreign object, such as receiver device 104. In some embodiments, the location of receiver device 104 corresponds to the location of the sensing coil(s) 1012 detecting a disturbance). In some embodiments, detecting the disturbance includes comparing the measured (e.g., peak) voltage across the terminals of a sensing coil 1012 with a threshold voltage that corresponds to a non-disturbed sensing coil 1012. Other implementations, such as based in resonance frequency, and changes in the inductance of the sensing coil 1012, may also be used.

In some embodiments, the sensing grid may be used to detect the position of the movable wireless power transmitter unit (e.g., 204, 300), e.g., based on the voltages across sensing coils 1012. In some embodiments, a transmitter coil $L_{TX}$ located in the movable wireless power transmitter unit is energized and sensing grid determines the location of the movable wireless power transmitter unit (e.g., 204, 300) based on the magnetic disturbance caused by the energizing of the transmitter coil $L_{TX}$.

In some embodiments, sensing grid 1002 may be implemented, for example, in a PCB. For example, in a PCB, sensing coils 1012 may be implemented using PCB traces. Other implementations are also possible.

Once the location of receiver device 104 is detected, the transmitter module (e.g., 202, 902) may cause the movable wireless power transmitter unit (e.g., 204, 300) to move towards receiver device 104. In some embodiments, a controller of the transmitter module may be used to detect the location of receiver device 104, and to control (e.g., via a flex PCB) the movable wireless power transmitter unit.

Figure 11:
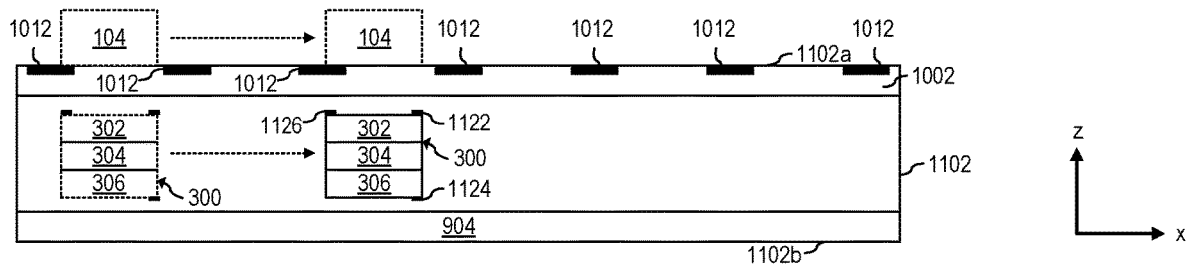
FIGS. 11 and 12 show transmitter modules, according to embodiments of the present invention.
Figure 11:
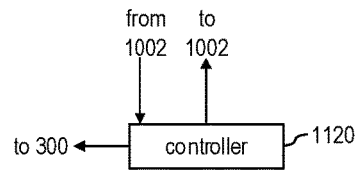

FIG. 11 shows transmitter module 1102, according to an embodiment of the present invention. As shown in FIG. 11, sensing grid 1002 may be attached to top surface 1102a of transmitter module 1102.

During normal operation, controller 1120 may, e.g., periodically, energize sensing grid 1002 to detect the presence of receiver device 104. Once the location of the presence of receiver device 104 is determined (e.g., based on voltages of sensing coils 1012), controller 1120 may activate linear motor coils (e.g., of arrangement 600, 700 or 800) of linear motor coil layer 306 to cause movable wireless power transmitter unit 300 to move towards the location of receiver device 104.

In some embodiments (e.g., as shown in FIG. 11), controller 1120 may sense when receiver device 104 is moved, e.g., during wireless power transfer, and may cause movable wireless power transmitter unit 300 to, e.g., slowly move to follow the location of receiver device 104, e.g., without interrupting the wireless power transfer between transmitter device 102 and receiver device 104.

In some embodiments, controller 1120 may be implemented, e.g., on top of layer 302. Other implementations are also possible.

In some embodiments, the position and velocity of movable wireless power transmitter unit 300 can be sensed using one or more optical sensors (e.g., 1122 and 1124), such as low resolution cameras, attached to movable wireless power transmitter unit 300 and facing up towards the sensing grid 1002 or down towards metal layer 904. A grid pattern (not shown) can be printed on the bottom surface of sensing grid 1002 or top surface of metal layer 904 to aid with detecting the speed, position and moving direction of movable wireless power transmitter unit 300 using, e.g., an optical flow image processing algorithm. In some embodiments, the grid pattern includes features placed at larger intervals to help with calculating the absolute position of movable wireless power transmitter unit 300.

In some embodiments, the position and velocity of movable wireless power transmitter unit 300 can be sensed using inertial sensor 1126. Inertial sensor may be implemented with an accelerometer and/or gyroscope, for example. Some embodiments may implement inertial sensor 1126 together with optical sensors 1122 and/or 1124. Other embodiments may implement inertial sensor without implementing optical sensors 1122 and 1124. Other embodiments may not implement inertial sensor 1126.

Figure 12:
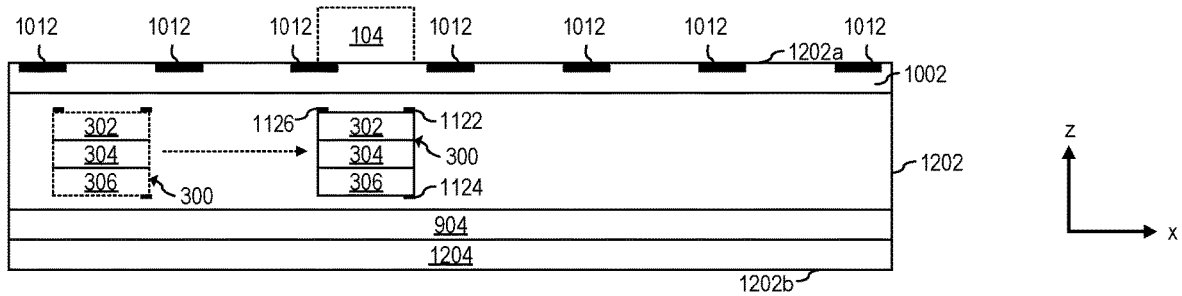

In some embodiments, a ferrous layer (e.g., an iron plate) is attached to metal layer 904. For example, FIG. 12 shows transmitter module 1202, according to an embodiment of the present invention. Transmitter module 1202 may be implemented in a similar manner as transmitter module 1102 and may operate in a similar manner as transmitter module 1102. Transmitter module 1202, however, includes ferrous layer 1204.

In embodiments in which ferrous layer 1202 is implemented below an aluminum layer 904, efficiency of the linear motor (e.g., using linear motor coils in linear motor coil layer 306) may be advantageously increased. Embodiments that include ferrous layer 1202 below aluminum layer 904 may not cause movable wireless power transmitter unit 300 to levitate while moving. In some embodiments, a DC current may be injected into one or more of the linear motor coils of linear motor coil layer 306 to cause movable wireless power transmitter unit 300 to be attracted to ferrous layer 1202, thereby advantageously preventing movement, e.g., once the movable wireless power transmitter unit 300 and receiver device 104 are aligned.

Figure 13A:
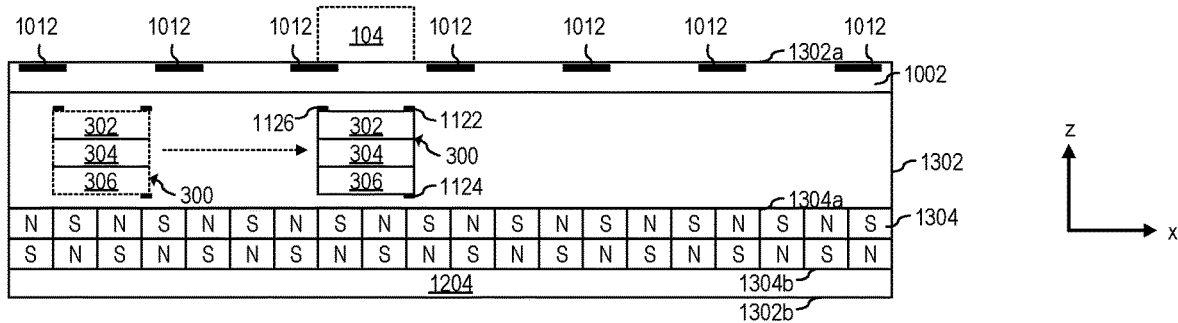
FIG. 13A shows a transmitter module, according to an embodiment of the present invention.

FIG. 13A shows transmitter module 1302, according to an embodiment of the present invention. Transmitter module 1302 may be implemented in a similar manner as transmitter module 1202 and may operate in a similar manner as transmitter module 1202. Transmitter module 1302, however, includes magnetic layer 1304.

Figure 13B:
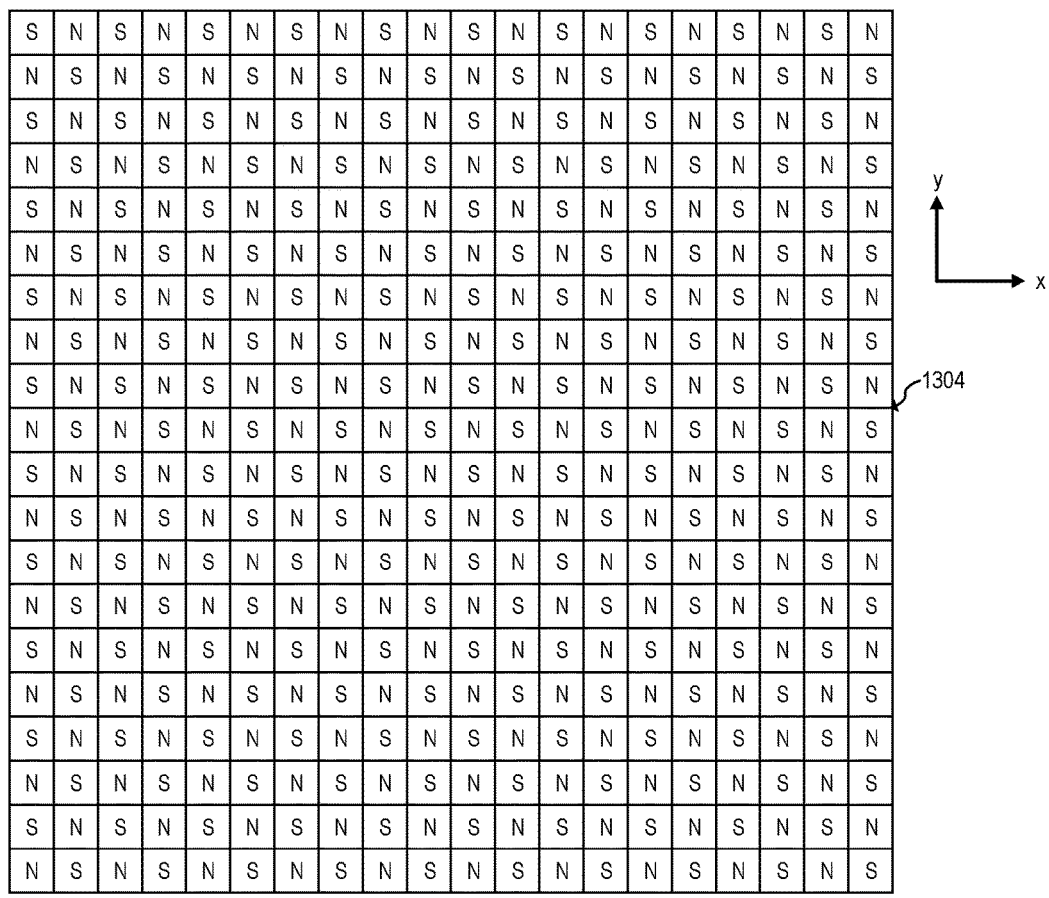
FIG. 13B shows a magnetic layer of the transmitter module of FIG. 13A, according to an embodiment of the present invention.

FIG. 13B shows a top view of magnetic layer 1304, according to an embodiment of the present invention. As shown, magnetic layer 1304 is magnetized with alternating North and South poles oriented perpendicular to surface 1304a in a checkerboard pattern. In some embodiments, discrete magnets may be used, which may be arranged in a similar manner as shown in FIG. 13B. In some embodiments, ferrous layer 1204 is used to increase the strength of the magnetic field on the top side of magnetic layer 1304.

During normal operation, the linear motor coils of linear motor coil layer 306 are activated synchronously with the magnetic pattern of magnetic layer 1304 to cause movement. In some embodiments, the linear motor coils of linear motor coil layer 306 are aligned with the magnetic pattern of magnetic layer 1304. For example, when one linear motor coil of linear motor coil layer 306 is aligned to a magnetic pole of magnetic layer 1304, another linear motor coil of linear motor coil layer 306 may sit, e.g., exactly, between two poles of the magnetic pattern of magnetic layer 1304.

Figure 14A:
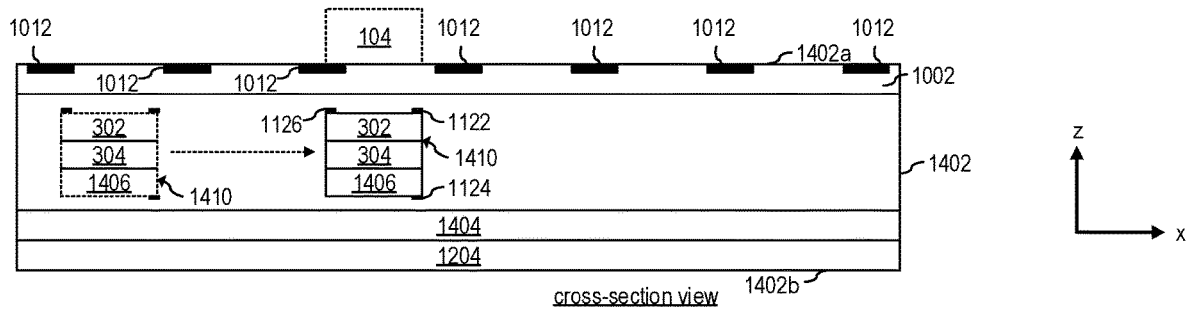
FIG. 14A shows a transmitter module, according to an embodiment of the present invention.
Figure 14A:
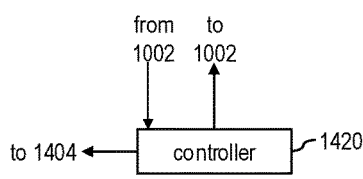

FIG. 14A shows transmitter module 1402, according to an embodiment of the present invention. Transmitter module 1402 may be implemented in a similar manner as transmitter module 1202 and may operate in a similar manner as transmitter module 1202. Transmitter module 1402, however, includes linear motor coil layer 1404 and movable wireless power transmitter unit 1410 includes metal (e.g., aluminum) layer 1406.

During normal operation, controller 1420 causes movable wireless power transmitter unit 1410 to move by activating linear motor coils of linear motor coil layer 1404 in an asynchronous manner.

Figure 14B:
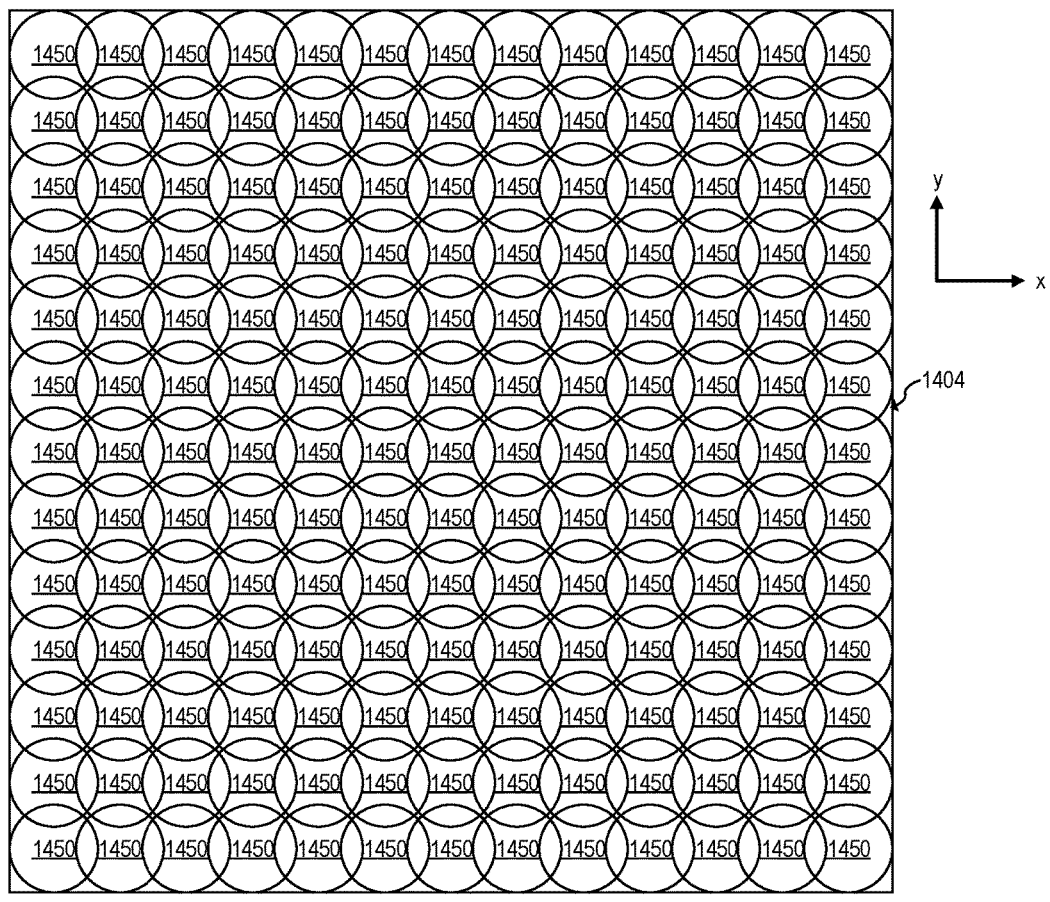
FIG. 14B shows the linear motor coil layer of FIG. 14A, according to an embodiment of the present invention.

FIG. 14B shows linear motor coil layer 1404, according to an embodiment of the present invention. As shown in FIG. 14B, linear motor coil layer 1404 includes a plurality of circular coils that are partially overlapping in a square pattern. Each of the plurality of circular coils has one or more turns. In some embodiments, the shape of the coils of linear motor coil layer 1404 may be different (e.g., such as square shape).

The direction of movement of movable wireless power transmitter unit 1410 may be determined based on the sequence of activation of the plurality of linear motor coils of linear motor coil layer 1404, and based on the location of movable wireless power transmitter unit 1410. For example, activating (e.g., pulsing) a linear motor coils of linear motor coil layer 1404 (e.g., that is beneath movable wireless power transmitter unit 1410 in the z-axis) may cause eddy currents in the metal (e.g., aluminum) plate 1406 so that the magnetic field created by the eddy currents interact with the variable magnetic field generated by the activated coil to push it in a particular direction. Activation patterns, similar to the patterns discussed with respect to FIGS. 6-8 may be used to cause movable wireless power transmitter unit 1410 to move in a desired direction.

In some embodiments, controller 1420 may be implemented near an edge of transmitter module 1402, for example.

As shown in FIG. 14A, transmitter module 1402 includes ferrous layer 1204 below linear motor coil layer 1404. In some embodiments, ferrous layer 1204 may be replaced with a ferrite layer.

Figure 15A:
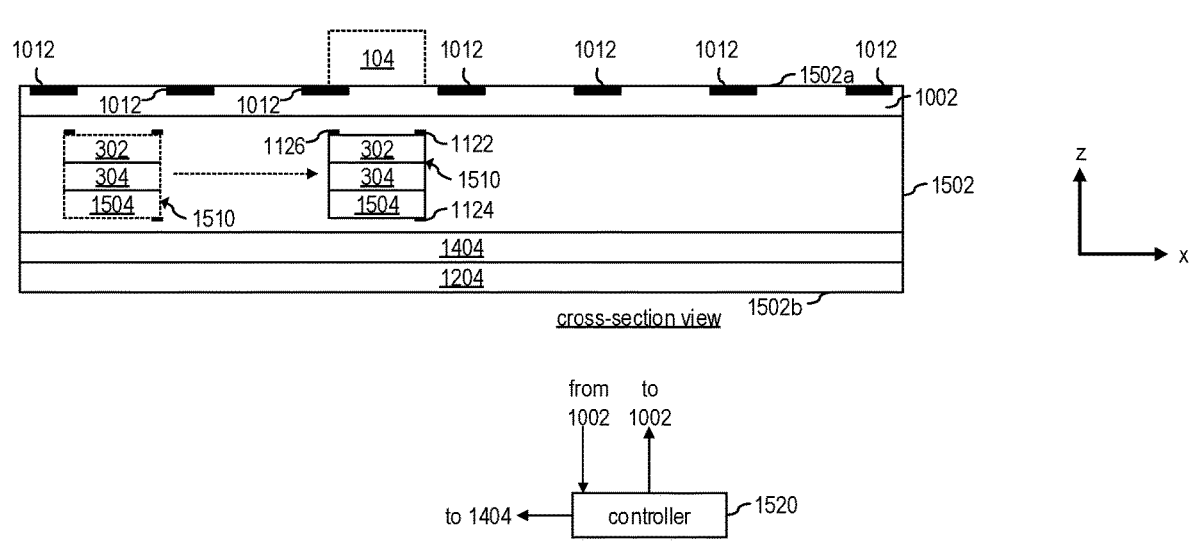
FIG. 15A shows a transmitter module, according to an embodiment of the present invention.

FIG. 15A shows transmitter module 1502, according to an embodiment of the present invention. Transmitter module 1502 may be implemented in a similar manner as transmitter module 1402 and may operate in a similar manner as transmitter module 1402. Transmitter module 1502, however, includes movable wireless power transmitter unit 1510, which includes magnetic layer 1504.

Figure 15B:
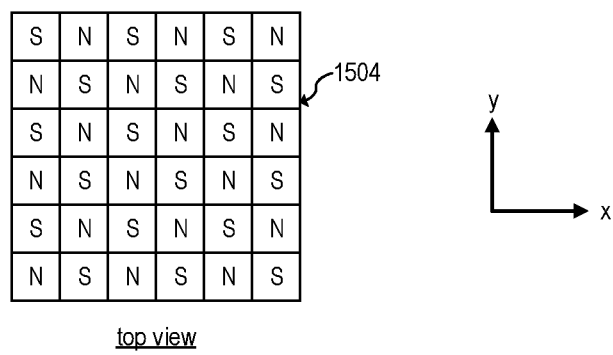
FIG. 15B shows a top view of the magnetic layer of FIG. 15A, according to an embodiment of the present invention.

FIG. 15B shows a top view of magnetic layer 1504, according to an embodiment of the present invention. As shown, magnetic layer 1504 is magnetized with alternating North and South poles in a checkerboard pattern. In some embodiments, discrete magnets may be used, which may be arranged in a similar manner as shown in FIG. 15B.

During normal operation, controller 1420 causes movable wireless power transmitter unit 1410 to move by activating linear motor coils of linear motor coil layer 1404 synchronously with the magnetic pattern of magnetic layer 1504 to cause movement of movable wireless power transmitter unit 1510. In some embodiments, the linear motor coils of linear motor coil layer 1404 are aligned with the magnetic pattern of magnetic layer 1504. For example, when one linear motor coil of linear motor coil layer 1404 is aligned to a magnetic pole of magnetic layer 1504, another linear motor coil of linear motor coil layer 1404 may sit, e.g., exactly, between two poles of the magnetic pattern of magnetic layer 1504.

Example embodiments of the present invention are summarized here. Other embodiments can also be understood from the entirety of the specification and the claims filed herein.

Example 1. A wireless power transmitter module including: a sensing grid configured to detect a receiver; a movable wireless power transmitter unit including a wireless power transmitter coil; and a two-dimensional linear motor including a plurality of linear motor coils configured to move the movable wireless power transmitter unit in a two-dimensional plane towards a location of the receiver.

Example 2. The wireless power transmitter module of example 1, where the movable wireless power transmitter unit further includes an optical sensor.

Example 3. The wireless power transmitter module of one of examples 1 or 2, where the movable wireless power transmitter unit further includes an inertial sensor.

Example 4. The wireless power transmitter module of one of examples 1 to 3, where the two-dimensional linear motor is a two-dimensional asynchronous linear motor configured to move the movable wireless power transmitter unit in any direction of the two-dimensional plane.

Example 5. The wireless power transmitter module of one of examples 1 to 4, where the two-dimensional asynchronous linear motor includes a conductive plate, and where the plurality of linear motor coils are configured to be powered so that the movable wireless power transmitter unit moves in a direction parallel to the sensing grid based on a force created between at least one of the plurality of linear motor coils and the conductive plate.

Example 6. The wireless power transmitter module of one of examples 1 to 5, where the movable wireless power transmitter unit includes the conductive plate.

Example 7. The wireless power transmitter module of one of examples 1 to 6, where the conductive plate is an aluminum (Al) plate.

Example 8. The wireless power transmitter module of one of examples 1 to 7, where the two-dimensional linear motor is a two-dimensional synchronous linear motor configured to move the movable wireless power transmitter unit in any direction of the two-dimensional plane.

Example 9. The wireless power transmitter module of one of examples 1 to 8, where the two-dimensional synchronous linear motor includes a magnetic layer, and where the plurality of linear motor coils are configured to be powered so that the movable wireless power transmitter unit moves in a direction parallel to the sensing grid based on a force created between at least one of the plurality of linear motor coils and the magnetic layer.

Example 10. The wireless power transmitter module of one of examples 1 to 9, where the movable wireless power transmitter unit includes the magnetic layer.

Example 11. The wireless power transmitter module of one of examples 1 to 10, where the magnetic layer includes discrete magnets.

Example 12. The wireless power transmitter module of one of examples 1 to 11, where the movable wireless power transmitter unit includes: a linear motor coil layer that includes the plurality of linear motor coils; and a ferrite layer located between the wireless power transmitter coil and the linear motor coil layer.

Example 13. The wireless power transmitter module of one of examples 1 to 12, where the movable wireless power transmitter unit includes: a conductive layer; and a ferrite layer located between the wireless power transmitter coil and the conductive layer.

Example 14. The wireless power transmitter module of one of examples 1 to 13, where the movable wireless power transmitter unit includes: a magnetic layer; and a ferrite layer located between the wireless power transmitter coil and the magnetic layer.

Example 15. The wireless power transmitter module of one of examples 1 to 14, further including a fixed conductive layer, where the movable wireless power transmitter unit is located between the sensing grid and the fixed conductive layer.

Example 16. The wireless power transmitter module of one of examples 1 to 15, further including a fixed ferrous layer, where the fixed conductive layer is located between the movable wireless power transmitter unit and the fixed ferrous layer.

Example 17. The wireless power transmitter module of one of examples 1 to 16, further including a fixed magnetic layer, where the movable wireless power transmitter unit is located between the sensing grid and the fixed magnetic layer.

Example 18. The wireless power transmitter module of one of examples 1 to 17, further including a fixed linear motor layer that includes the plurality of linear motor coils, where the movable wireless power transmitter unit is located between the sensing grid and the fixed linear motor layer.

Example 19. A method for wireless power transfer, the method including: detecting a receiver using a sensing grid; and moving a movable wireless power transmitter unit that includes a wireless power transmitter coil in a two-dimensional plane towards a location of the receiver using a two-dimensional linear motor.

Example 20. A wireless power transmitter module including: a sensing grid configured to detect a receiver, the sensing grid located in a sensing layer; a fixed layer that is parallel to the sensing layer, the fixed layer including a metal; a movable wireless power transmitter unit including a wireless power transmitter coil, the movable wireless power transmitter unit located between the sensing layer and the fixed layer; and a two-dimensional linear motor including a plurality of linear motor coils configured to move the movable wireless power transmitter unit in a two-dimensional plane towards a location of the receiver, where the two-dimensional plane is parallel to the sensing layer.

Example 21. The wireless power transmitter module of example 20, further including a position sensor configured to determine a location of the movable wireless power transmitter unit using the sensing grid.

Example 22. The wireless power transmitter module of one of examples 20 or 21, where the sensing layer includes an optical pattern, and where the position sensor includes an optical sensor directed towards the optical pattern.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless power transmitter comprising:
a sensing grid comprising sensors arranged in rows and columns in a two-dimensional plane, wherein the sensing grid is configured to detect a receiver; and
a movable wireless power transmitter comprising:
a coil layer comprising at least one wireless power transmitter coil;
a ferrite layer; and
a linear motor coil layer having a two-dimensional linear motor comprising a plurality of linear motor coils configured to move the movable wireless power transmitter in the two-dimensional plane towards a location of the receiver.

2. The wireless power transmitter of claim 1, wherein the two-dimensional linear motor is a two-dimensional asynchronous linear motor, wherein the two-dimensional asynchronous linear motor comprises a conductive plate, and wherein the plurality of linear motor coils is configured to be powered so that the movable wireless power transmitter moves in a direction parallel to the sensing grid based on a force created between at least one of the plurality of linear motor coils and the conductive plate.

3. The wireless power transmitter of claim 1, wherein the two-dimensional linear motor is a two-dimensional synchronous linear motor, wherein the two-dimensional synchronous linear motor comprises a magnetic layer, and wherein the plurality of linear motor coils is configured to be powered so that the movable wireless power transmitter moves in a direction parallel to the sensing grid based on a force created between at least one of the plurality of linear motor coils and the magnetic layer.

4. The wireless power transmitter of claim 3, wherein the magnetic layer comprises discrete magnets.

5. The wireless power transmitter of claim 1, wherein the coil layer located above the ferrite layer, and wherein the ferrite layer is located above the linear motor coil layer.

6. The wireless power transmitter of claim 1, wherein the movable wireless power transmitter comprises a controller configured to:
periodically energize the sensing grid in order to detect a presence of the receiver; and activate the linear motor coils so that they move the movable wireless power transmitter towards the receiver.

7. A wireless power transmitter comprising:
a top surface extending in a two-dimensional plane;
a bottom surface extending in the two-dimensional plane;
a sensing grid located at the top surface, wherein the sensing grid comprises sensors arranged in rows and columns in the two-dimensional plane, and wherein the sensing grid is configured to detect a receiver at the top surface;
a conductive plate located at the bottom surface; and
a movable wireless power transmitter comprising:
　a coil layer comprising at least one wireless power transmitter coil;
　a ferrite layer; and
　a linear motor coil layer having a two-dimensional linear motor comprising a plurality of linear motor coils configured to move the movable wireless power transmitter in the two-dimensional plane towards a location of the receiver.

8. The wireless power transmitter of claim 7, wherein the movable wireless power transmitter further comprises a first optical sensor located on a top side of the movable wireless power transmitter and a second optical sensor located on a bottom side of the movable wireless power transmitter.

9. The wireless power transmitter of claim 8, wherein the movable wireless power transmitter further comprises an inertial sensor located either at the top side of the movable wireless power transmitter or at the bottom side of the movable wireless power transmitter.

10. The wireless power transmitter of claim 7, wherein the conductive plate at the bottom surface comprises aluminum (Al).

11. The wireless power transmitter of claim 7, wherein the movable wireless power transmitter is configured to levitate over the conductive plate when moving towards the receiver.

12. The wireless power transmitter of claim 7, wherein the two-dimensional linear motor is a two-dimensional synchronous linear motor, and wherein the plurality of linear motor coils is configured to be powered so that the movable wireless power transmitter moves in a direction parallel to the sensing grid based on a force created between at least one of the plurality of linear motor coils and the conductive plate.

13. The wireless power transmitter of claim 7, further comprising a ferrous layer located below the conductive plate at the bottom surface.

14. The wireless power transmitter of claim 7, wherein the linear motor coil layer has nine non-overlapping regions in a square pattern, wherein eight regions surround an inner region, wherein the plurality of linear motor coils comprises eight coils located in the eight regions surrounding the inner region, and wherein the coils are partially overlapping.

15. The wireless power transmitter of claim 7, wherein the linear motor coil layer has five regions arranged in a star pattern, wherein the plurality of linear motor coils comprises five coils located in the five regions, and wherein the coils are partially overlapping.

16. The wireless power transmitter of claim 7, wherein the linear motor coil layer has a plurality of regions arranged in a star circular shape, wherein the plurality of linear motor coils comprises a coil located in each region, and wherein the coils are partially overlapping.

17. The wireless power transmitter of claim 7, wherein the movable wireless power transmitter comprises a controller configured to:
detect a presence of the receiver; and
activate the linear motor coils so that they move the movable wireless power transmitter towards the receiver.

18. The wireless power transmitter of claim 17, wherein the controller is configured to periodically energize the sensing grid in order to detect the presence of the receiver.

19. A wireless power transmitter comprising:
a top surface extending in a two-dimensional plane;
a bottom surface extending in the two-dimensional plane;
a sensing grid located at the top surface, wherein the sensing grid comprises sensors arranged in rows and columns in the two-dimensional plane, and wherein the sensing grid is configured to detect a receiver at the top surface;
a magnetic plate located at the bottom surface, wherein the magnetic plate is magnetized with alternating North and South poles; and
a movable wireless power transmitter located between the sensing grid and the magnetic plate, the movable wireless power transmitter comprising:
　a coil layer comprising at least one wireless power transmitter coil;
　a ferrite layer; and
　a linear motor coil layer having a two-dimensional linear motor comprising a plurality of linear motor coils configured to move the movable wireless power transmitter in the two-dimensional plane towards a location of the receiver.

20. The wireless power transmitter of claim 19, wherein the two-dimensional linear motor is a two-dimensional synchronous linear motor, and wherein the plurality of linear motor coils is configured to be powered so that the movable wireless power transmitter moves in a direction parallel to the sensing grid based on a force created between at least one of the plurality of linear motor coils and the magnetic plate.

* * * * *